US008893680B2

(12) United States Patent
Yagi (10) Patent No.: US 8,893,680 B2
(45) Date of Patent: Nov. 25, 2014

(54) INTAKE VALVE OF INTERNAL COMBUSTION ENGINE

(75) Inventor: Shintaro Yagi, Shizuoka-Ken (JP)

(73) Assignee: Suzuki Motor Corporation, Hamamatsu-shi (JP)

( * ) Notice: Subject to any disclaimer, the term of this patent is extended or adjusted under 35 U.S.C. 154(b) by 539 days.

(21) Appl. No.: 13/358,048

(22) Filed: Jan. 25, 2012

(65) Prior Publication Data

US 2012/0199092 A1 Aug. 9, 2012

(30) Foreign Application Priority Data

Feb. 3, 2011 (JP) .................................. 2011-021919

(51) Int. Cl.
*F16K 31/00* (2006.01)

(52) U.S. Cl.
USPC .................... 123/188.3; 251/368; 29/888.453

(58) Field of Classification Search
USPC ......... 123/188.3; 29/888.4, 888.453; 251/368
See application file for complete search history.

(56) References Cited

U.S. PATENT DOCUMENTS

| 1,557,022 A | 10/1925 | Chilton |
| 2,162,063 A | 6/1939 | Crawford |

FOREIGN PATENT DOCUMENTS

| DE | 102 04 122 | 5/2003 |
| DE | 103 54 077 | 6/2005 |
| EP | 1 188 975 | 3/2002 |
| GB | 123416 | 2/1919 |
| JP | 57-26216 | 2/1982 |
| JP | 61202606 | 12/1986 |
| JP | 2003-343219 | 12/2003 |
| JP | 2004-308607 | 11/2004 |
| WO | 03/050395 | 6/2003 |
| WO | 03/100223 | 12/2003 |

OTHER PUBLICATIONS

European Search Report dated Apr. 4. 2012 for corresponding European Patent Application No. 12152362.5

*Primary Examiner* — Noah Kamen
(74) *Attorney, Agent, or Firm* — Barnes & Thornburg LLP (57) ABSTRACT

An intake valve of an internal combustion engine includes a valve body and a valve stem extending from a central portion of the valve body. The valve body includes a valve body framework portion and a valve body thick portion provided on an outer side of the valve body framework portion. The valve body framework portion and the valve stem are made of iron material and the valve body thick portion is made of aluminum alloy.

9 Claims, 6 Drawing Sheets

INTAKE VALVE OF INTERNAL COMBUSTION ENGINE

PRIORITY CLAIM

This patent application claims priority to Japanese Patent Application No. 2011-021919, filed 3 Feb. 2011, the disclosure of which is incorporated herein by reference in its entirety.

BACKGROUND

1. Field

Disclosed embodiments related to an intake valve of an internal combustion engine.

2. Related Art

In a high-rotation and high-powered engine mounted in a motorcycle etc., it is required for moving parts of a valve train mechanism to reduce weights, and accordingly, intake and exhaust valve which are made of titanium alloy have been become usable.

The intake and exhaust valves made of titanium alloy have high specific strength and are suitable for weight saving, but have inferior abrasion resistance. Thus, it is necessary for a stem end portion of the valve to perform an expensive surface treatment such as fine shot peening and surface coating (for example, DLC (diamond-like carbon)). Since the titanium alloy is also expensive, manufacturing cost of these valves is increased.

Patent Document 1 (Japanese Utility Model Laid-Open No. 61-202606) discloses intake and exhaust valves including a valve body and a valve stem made of titanium alloy, and a stem end portion connected to dissimilar metal (for example, iron metal) having excellent abrasion resistance.

In the intake and exhaust valves disclosed in Patent Document 1, portions other than the stem end portion are made of titanium alloy. Thus, they can reduce their weight, but their cost is increased.

Furthermore, although the durability of the stem end portion is improved due to the dissimilar metal (iron metal), the reliability at a portion connecting the dissimilar metal and the titanium alloy is not necessarily sufficient.

SUMMARY

Disclosed embodiments provide an intake valve of an internal combustion engine capable of realizing reduction in weight and decreasing in manufacturing cost while improving durability of a stem end portion of the valve.

One disclosed embodiment provides an intake valve of an internal combustion engine comprises a valve body; and a valve stem extending from a central portion of the valve body, wherein the valve body includes a valve body framework portion and a valve body thick portion provided on an outer side of the valve body framework portion, and the valve body framework portion and the valve stem are made of iron material and the valve body thick portion is made of aluminum alloy.

According to one disclosed embodiment, the valve body includes the valve body framework portion made of the iron material and the valve body thick portion made of the aluminum alloy. Thus, the weight of the intake valve can be reduced as compared with the valve body made of only iron material. Further, the manufacturing cost can be reduced as compared with the valve body made of the titanium alloy. Furthermore, since the valve stem is made of the iron material, it is not necessary to perform an expensive surface treatment or fixing treatment to other parts or members, thus improving the durability of a stem end portion.

The nature and further characteristic features of the present invention will be made clearer from the following descriptions made with reference to the accompanying drawings.

BRIEF DESCRIPTION OF THE DRAWINGS

In the accompanying drawings:

FIG. 3 is an exploded view of the intake valve shown in FIG. 2, in which

FIG. 6 shows the framework of the valve body shown in FIG. 3, in which

DESCRIPTION OF THE DISCLOSED EMBODIMENTS

Disclosed embodiments will be explained below with reference to the accompanying drawings. It should be noted that the present invention is not limited to these disclosed embodiments.

First Disclosed Embodiment

FIGS. 1 to 6

Figure 1:
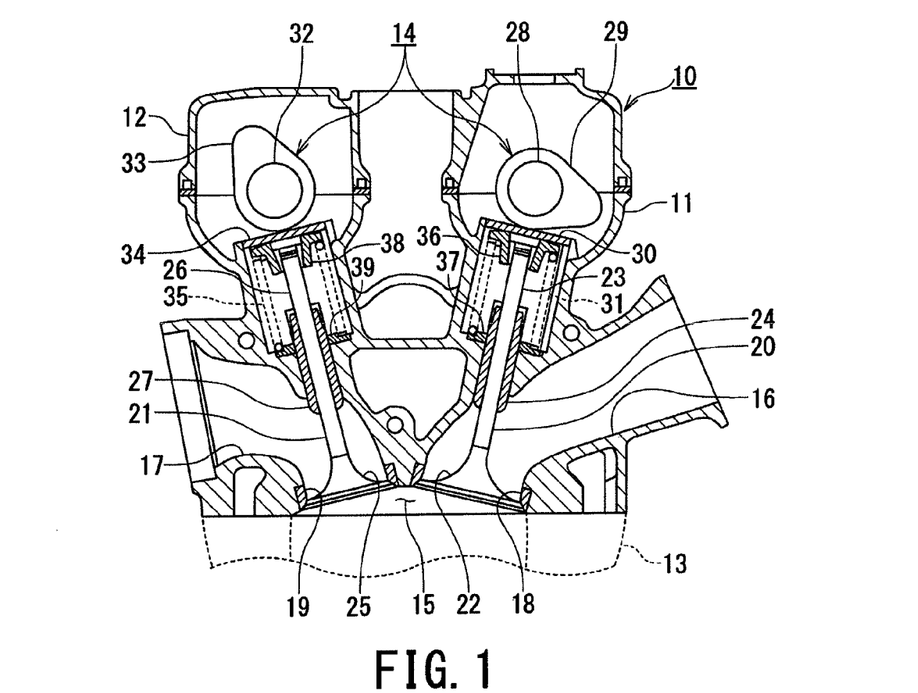
FIG. 1 is a sectional view showing a valve train mechanism of an engine to which an intake valve of an internal combustion engine according to a first disclosed embodiment is applied.

FIG. 1 is a cross-sectional view showing a valve train mechanism of an engine to which an intake valve of an internal combustion engine according to a first disclosed embodiment is applied.

The engine 10 shown in FIG. 1 is, for example, an engine mounted in a motorcycle having a cylinder head 11 and a cylinder head cover 12 in which a DOHC-type (double-overhead-camshaft type) valve train mechanism 14 is disposed.

As shown in FIG. 1, the cylinder head 11 of the engine 10 includes a combustion chamber 15 formed between the cylinder head 11 and a cylinder block 13, two intake ports 16 communicated with the combustion chamber 15, and two exhaust ports 17 communicated with the combustion chamber 15. The intake port 16 and the exhaust port 17 include valve sheets 18 and 19, respectively, at their boundaries with the combustion chamber 15. The valve train mechanism 14 opens and closes the two intake valves 20 provided in the intake ports 16 and the two exhaust valves 21 provided in the exhaust ports 17.

The intake valves 20 open and close the intake ports 16. The intake valve 20 includes a valve body 22 having a substantially circular umbrella-like shape (i.e., ring-shaped outer configuration) and a valve stem 23 extending toward substantially upward from the center of the valve body 22. The cylinder head 11 includes a stem guide 24 into which the valve stem 23 is slidably inserted.

The exhaust valves 21 open and close the exhaust ports 17. The exhaust valve 21 includes a valve body 25 having an umbrella-like shape and a valve stem 26 extending toward substantially upward from the center of the valve body 25. The cylinder head 11 includes a stem guide 27 into which a valve stem 26 is slidably inserted. As viewed from a side of the cylinder head 11, the intake valve 20 and the exhaust valve 21 are disposed so that the valve stem 23 and the valve stem 26 provide an approximately V-shape.

The valve gears 14 include an intake camshaft 28 rotatably pivoted by the cylinder head 11, two intake cams 29 provided on the intake camshaft 28, an intake tappet 30 lifting the intake valves 20 along cam profiles of the intake cams 29, and an intake valve spring 31 urging the intake valves 20 in a direction where the intake valves 20 are closed.

Furthermore, the valve train mechanism 14 include an exhaust camshaft 32 rotatably pivoted by the cylinder head 11, two exhaust cams 33 provided on the exhaust camshaft 32, an exhaust tappet 34 lifting the exhaust valves 21 along cam profiles of the exhaust cams 33, and an exhaust valve spring 35 urging the exhaust valves 21 in a direction where the exhaust valves 21 are closed.

The intake camshaft 28 is located above the intake valves 20 and is rotatably pivoted by the cylinder head 11 and the head cover 12. The axial center of the intake camshaft 28 is arranged approximately on an extension of the valve stem 23 of the intake valves 20. The intake cams 29 are integrated with the intake camshaft 28. The intake cams 29 are provided at appropriate positions suitable for lifting the intake valves 20. The intake tappet 30 is interposed between the intake valves 20 and the intake cams 29 so as to convert the rotational movement of the intake cams 29 into the reciprocal movement of the intake valves 20.

The intake valve spring 31 is interposed between a spring retainer 36 provided at an upper end of the valve stem 23 and a spring sheet 37 engaged loosely with the stem guide 24. The intake valve spring 31 urges the intake valves 20 via the spring retainer 36 in the direction for closing the intake valves 20. The valve body 22 of the intake valve 20 is pressed by the valve sheet 18 due to the urging force of the intake valve spring 31 to thereby close the intake ports 16.

The exhaust camshaft 32 is positioned above the exhaust valves 21 and is rotatably pivoted by the cylinder head 11 and the head cover 12. The axial center of the exhaust camshaft 32 is arranged approximately on an extension of the valve stem 26 of the exhaust valves 21. The intake camshaft 28 and the exhaust camshaft 32 are positioned so that the axes thereof substantially parallel to each other.

The exhaust cams 33 are integrated with the exhaust camshaft 32. The exhaust cams 33 are provided at appropriate positions suitable for lifting the exhaust valves 21. The exhaust tappet 34 is interposed between the exhaust valves 21 and the exhaust cams 33 to thereby convert the rotational movement of the exhaust cams 33 into the reciprocal movement of the exhaust valves 21.

The exhaust valve spring 35 is interposed between a spring retainer 38 provided at an upper end of the valve stem 26 and a spring sheet 39 engaged loosely with the stem guide 27. The exhaust valve spring 35 urges the exhaust valves 21 via the spring retainer 38 in the direction for closing the exhaust valves 21. The valve body 25 of the exhaust valve 21 is pressed by the valve sheet 19 due to the urging force of the exhaust valve spring 35 so as to close the exhaust ports 17.

The valve train mechanism 14 rotates the intake camshaft 28 and the intake cams 29 integrally so as to open and close the intake valves 20 through the intake tappet 30. The valve train mechanism 14 also rotates the exhaust camshaft 32 and the exhaust cams 33 integrally so as to open and close the exhaust valves 21 through the exhaust tappet 34.

Figure 2:
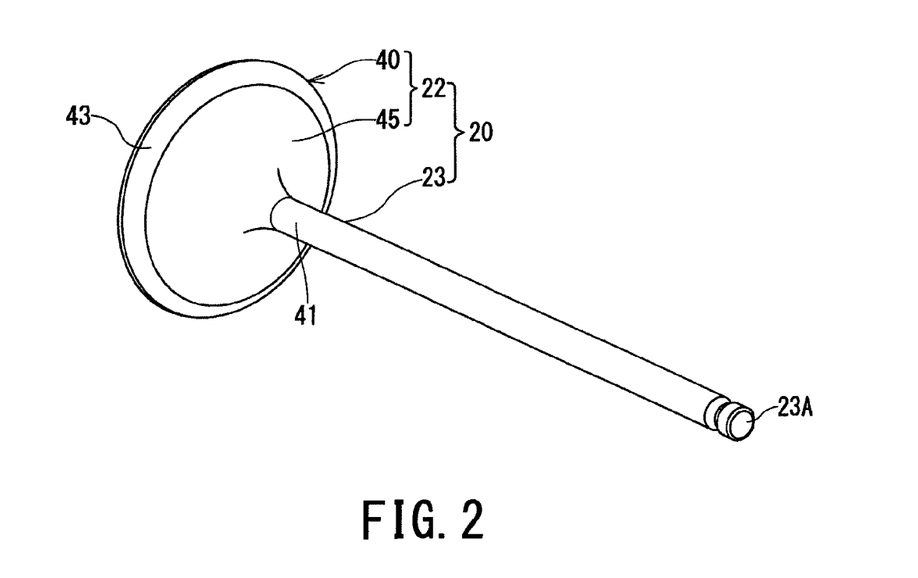
FIG. 2 is a perspective view of the intake valve shown in FIG. 1.
Figure 3A:
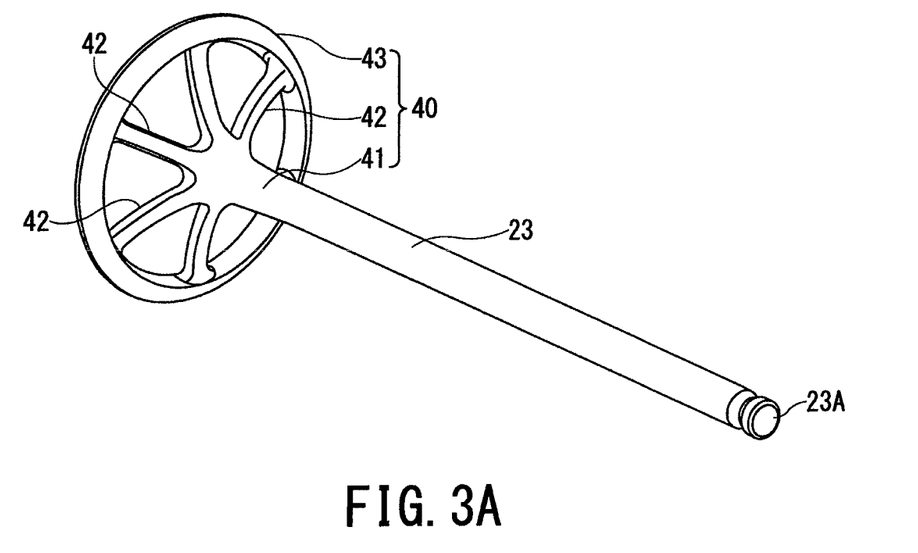
FIG. 3A is a perspective view of a framework of a valve body and a valve stem.
Figure 3B:
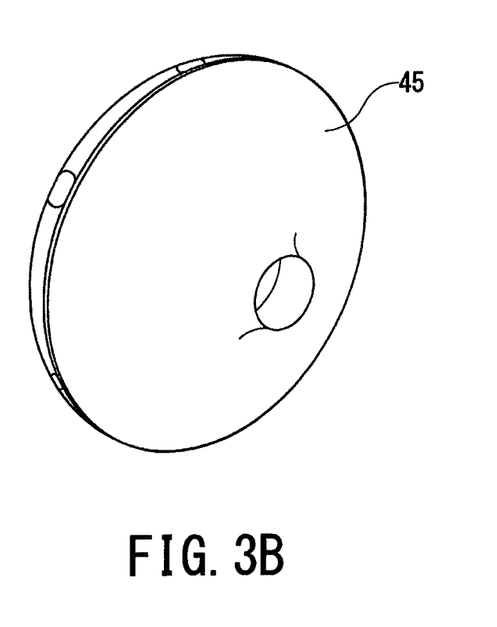
FIG. 3B is a perspective view of a valve body thick portion.

As shown in FIGS. 2 and 3, the intake valve 20 serving as described above includes a valve stem 23 extending from the center of the valve body 22. The valve body 22 includes a valve body framework (portion) 40 and a valve body thick portion 45 on an inside of the valve body framework 40.

In the first disclosed embodiment, the valve stem 23 is integrated with a central portion 41 of the valve body framework portion 40.

The valve body framework portion 40 includes a plurality of spoke portions 42 radially extended from the central portion 41 of the framework portion 40 and an annular ring portion 43 connected to an outer end of each spoke portion 42. The ring portion 43 constitutes to an outer peripheral portion of the framework 40 of the valve body 22.

Figure 4:
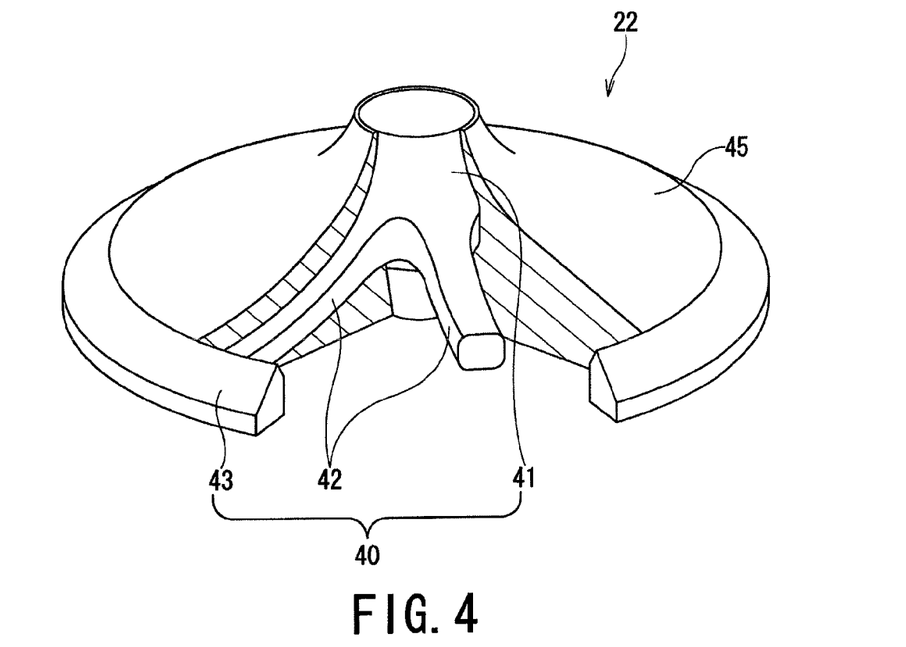
FIG. 4 is a perspective view showing the valve body shown in FIG. 2, having a partially cut-out portion.
Figure 5:
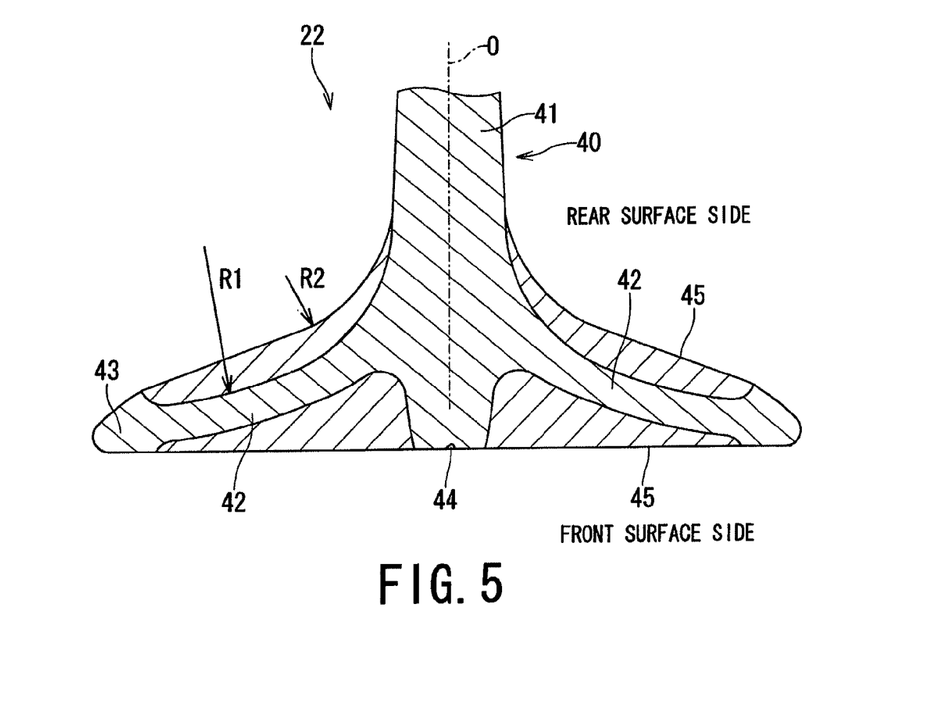
FIG. 5 is a sectional view of the valve body shown in FIG. 2.
Figure 6A:
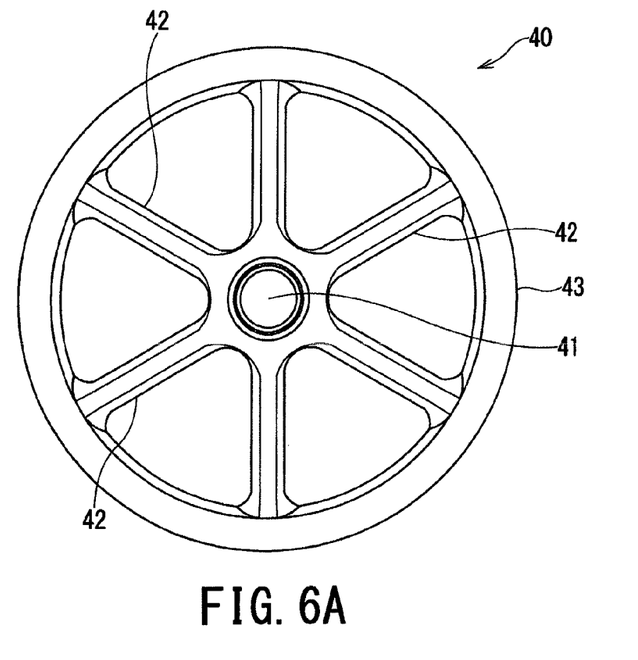
FIG. 6A is a front view of the valve body framework having six spoke portions.
Figure 6B:
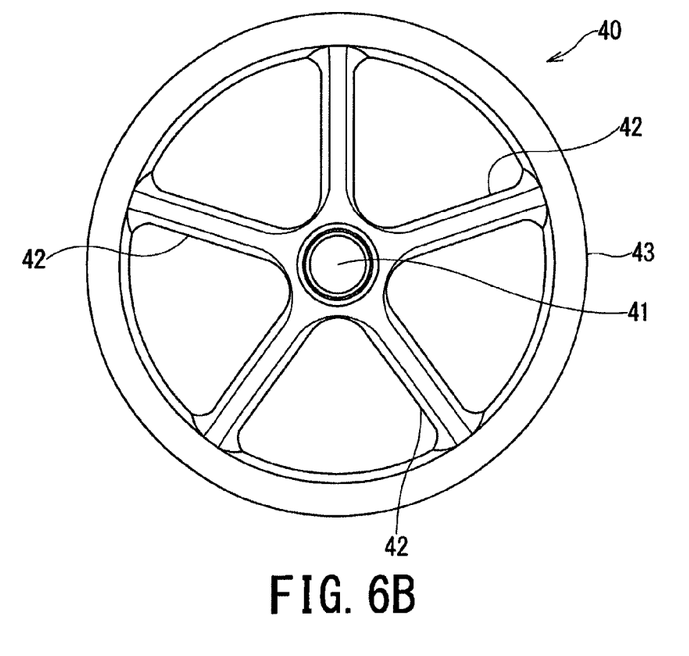
FIG. 6B is also a front view of the valve body framework having five spoke portions.

As shown in FIGS. 4 and 5, the ring portion 43 is exposed from the valve body thick portion 45 to serve as a valve sheet contact portion contacting the valve sheet 18 of the cylinder head 11 (FIG. 1). As shown in FIG. 6, although the number of the spoke portions 42 may be six or five, the strength of the framework portion 40 varies depending on the number of the spoke portions 42 and their section modulus.

As shown in FIGS. 2 and 3, the valve body framework 40 of the valve body 22 and the valve stem 23 in the intake valve 20 are integrally formed by a forging process using iron material (for example, SUH3 and SUH11 prescribed by Japanese Industrial Standard (JIS)). On the other hand, the valve body thick portion 45 of the valve body 22 is made of aluminum alloy, especially AC9B having high strength at an elevated temperature and a low coefficient of thermal expansion. As shown in FIGS. 4 and 5, the valve body thick portion 45 is formed each on the front surface and on the rear surface of the valve body framework portion 40 and is formed by a casting process so as to wrap the framework portion 40 from the front surface side and the rear surface side thereof.

Since the central portion 41, the spoke portions 42 and the ring portion 43 of the framework 40 of the valve body 22, and, and the valve stem 23 thereof are made of iron material, the intake valve 20 can provides necessary strength, and furthermore, the abrasion resistance of the ring portion 43 serving as the valve sheet contact portion may be maintained. Moreover, since the valve body thick portions 45 provided on the front surface and the rear surface of the valve body framework portion 40 are made of aluminum alloy, the combustion pressure in the combustion chamber 15 (FIG. 1) is sealed by the valve body thick portion 45 on the front surface side, and the intake air flowing in the intake port 16 is straightened (rectified) by the rear surface side of the valve body thick portion 45.

Since the valve body thick portion 45 embraces the central portion 41 and the spoke portions 42 of the body valve framework portion 40, the spoke portions 42 may be made thinner than the ring portion 43 exposed from the valve body thick portion 45. In addition, since the valve body thick portion 45 rectifies the flow of the intake air, a curvature radius R1 of the spoke portion 42 on the rear surface side is made larger than a curvature radius R2 of the valve body thick portion 45 on the rear surface side to thereby avoid the concentration of stress to be generated on the central portion 41 of the valve body framework portion 40.

As shown in FIG. 5, the central portion 41 of the framework portion 40 has a recess 44 formed in the front surface side front on the axial central portion (axis O) of the intake valve 20. The recess 44 serves as a process center when the valve body framework portion 40 is formed by the forging process and then the grinding process. By grinding the valve body framework portion 40 by utilizing the recess 44 as the process center, the valve body framework portion 40 can be formed by the forging process without being offset and with the total weight balance being stably maintained as well as suppressing in the dispersion of the strength.

As mentioned above, according to the first disclosed embodiment, the following advantageous effects (1) to (6) will be obtainable.

(1) Since the valve body 22 of the intake valve 20 includes the framework portion 40 made of the iron material and the thick portion 45 made of the aluminum alloy, the weight of the intake valve 20 can be reduced as compared in a case where the valve body is made of only iron material. In addition, the manufacturing cost can be reduced as compared with the valve body made of titanium alloy.

Furthermore, the heat of the intake valve 20 can be favorably transferred by using the aluminum alloy, and by reducing the weight of the intake valve 20, the spring load of the intake valve spring 31 (FIG. 1) can be set to a low value. Thus, the contact pressure between the intake valve 20 and the intake cam 29 is reduced, and accordingly, the mechanical loss of the valve train mechanism 14 can be reduced.

(2) Since the valve stem 23 of the intake valve 20 is made of the iron material, the diameter of the valve stem 23 can be reduced to thereby reduce the intake resistance thereof, and the durability of the stem end portion 23A of the valve stem 23 can be improved. In addition, by improving the durability of the stem end portion 23A, an expensive surface treatment such as surface coating and fine shot peening by using DLC (diamond-like carbon) on the stem end portion 23A, or fixing treatment of dissimilar metal as disclosed in Patent Document 1 is not required, thus effectively reducing the manufacturing cost of the intake valve 20.

(3) Since the valve body thick portion 45 is provided on the front surface side and rear surface side of the framework portion 40 of the valve body 22 of the intake valve 20, the intake valve 20 can provide favorable heat conductivity.

Furthermore, since the valve body thick portion 45 is formed by casting process so as to wrap around (embrace) the valve body framework portion 40 from the front surface side and the rear surface side, the valve body thick portion 45 can be prevented from dropping out even if the thick portion 45 is peeled off from the valve body framework portion 40. Therefore, the sealing property of the combustion pressure is reduced by the intake valve 20 prior to the dropout of the valve body thick portion 45. Thus, the damage of the engine 10 due to the dropout can be preliminarily prevented by exchanging the intake valve 20.

(4) Since the valve body framework portion 40 of the valve body 22 in the intake valve 20 includes the plurality of spoke portions 42 radially extending from the central portion 41 and the ring portion 43 connected to the outer ends of the spoke portions 42, the weight of the intake valve 20 can be reduced while ensuring its strength.

(5) Since the curvature radius R1 of the spoke portion 42 of the valve body framework portion 40 on the rear surface side is larger than the curvature radius R2 of the valve body thick portion 45 on the rear surface side in the valve body 22 of the intake valve 20, the concentration of stress on the central portion 41 of the valve body framework portion 40 can be avoided. Consequently, the valve body framework portion 40 can be thinned, and hence, the weight of the intake valve 20 can be reduced.

(6) Since the ring portion 43 of the valve body framework portion 40 made of the iron material serves as the valve sheet contact portion in the valve body 22 of the intake valve 20, the abrasion resistance of the valve sheet contact portion can be improved.

Second Disclosed Embodiment

Figure 7:
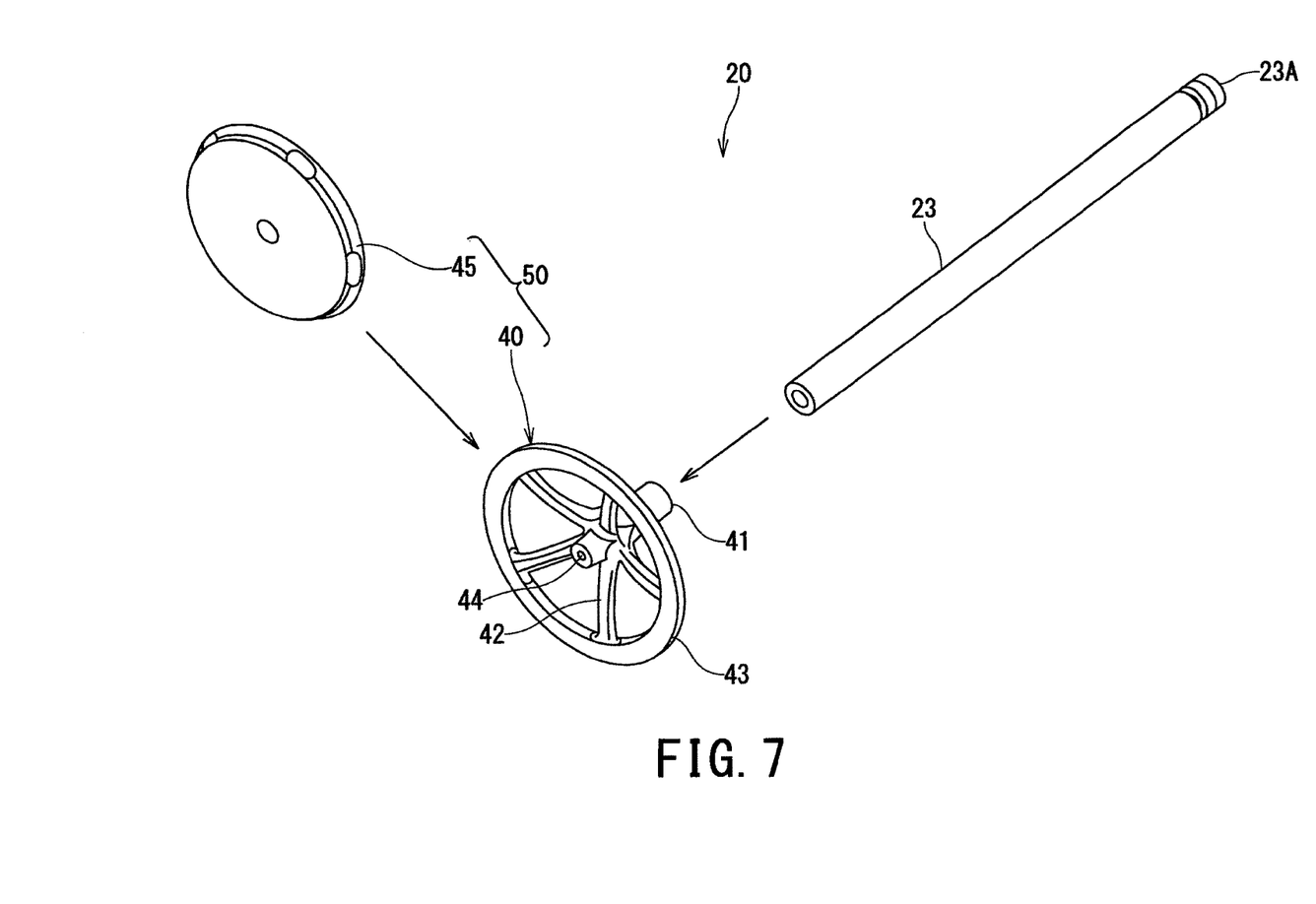
FIG. 7 is an exploded perspective view showing an intake valve of an internal combustion engine according to a second disclosed embodiment.

FIG. 7

FIG. 7 is an exploded perspective view showing an intake valve of an internal combustion engine according to a second disclosed embodiment. In the second disclosed embodiment, portions or members identical to those in the first embodiment are denoted by identical reference numerals and explanation thereof is simplified or omitted herein.

In a valve body 50 of the intake valve 20 according to the second embodiment, the valve body framework portion 40 is constructed separately from the valve stem 23. After the valve body framework portion 40 is welded or like to the valve stem 23, the valve body thick portion 45 is formed on the valve body framework portion 40 by casting, thereby providing the intake valve 20. The valve stem 23 may formed to have a hollow body structure which can be filled with sodium having favorable thermal conductivity. Since the valve body 50 of the intake valve 20 is constructed with the individually formed valve stem 23 and valve body framework portion 40, the productivity of the intake valve 20 can be improved.

Third Disclosed Embodiment

Figure 8:
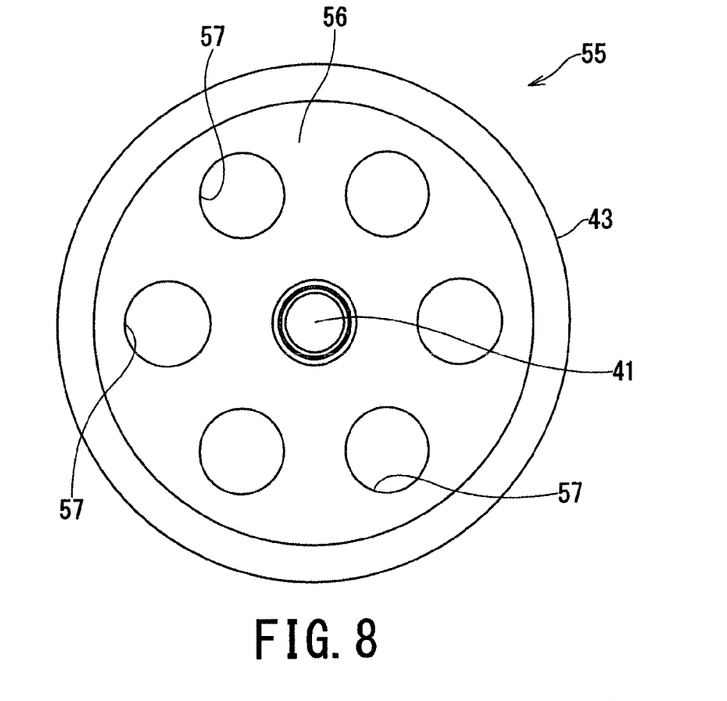
FIG. 8 is a front view showing a framework of the valve body in an intake valve of an internal combustion engine according to a third disclosed embodiment.

FIG. 8

FIG. 8 is a front view showing a valve body framework portion of a valve body in an intake valve of an internal combustion engine according to a third disclosed embodiment. In the third disclosed embodiment, portions or members identical to those in the first disclosed embodiment are denoted by identical reference numerals and explanation thereof is simplified or omitted herein.

In a valve body framework portion 55 of the valve body 22 of the intake valve 20 according to the third embodiment, the central portion 41 and the ring portion 43 are connected by a plate-shaped portion or member 56. A plurality of through holes 57 are formed so as to penetrate the plate portion 56 from the front surface side to the rear surface side. The valve body thick portions 45, not shown in FIG. 8, provided on the front surface and the rear surface of the valve body framework portion 55 are connected by the through holes 57, so that the dropout of the valve body thick portion 45 can be reliably prevented.

Fourth Disclosed Embodiment

Figure 9:
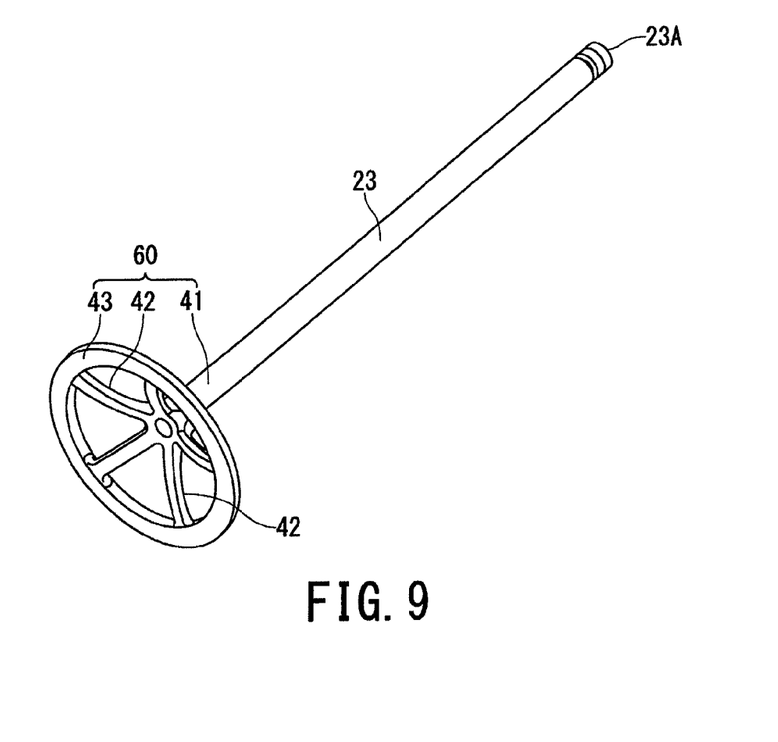
FIG. 9 is a perspective view showing a framework of the valve body and a valve stem in an intake valve of an internal combustion engine according to a fourth disclosed embodiment.

FIG. 9

FIG. 9 is a perspective view showing a valve body framework portion of a valve body and a valve stem in an intake valve of an internal combustion engine according to a fourth disclosed embodiment. In the fourth disclosed embodiment, portions or members identical to those in the first embodiment are denoted by identical reference numerals and explanation thereof is simplified or omitted herein.

In a valve body framework portion 60 of the valve body 22 of the intake valve 20 according to the fourth embodiment, the central portion 41 does not extend to the front surface side, and hence, any recess such as that 44 in FIG. 5, serving as the process center during the grinding operation, is not formed to the central portion 41. In the valve body framework portion 60 according to the fourth embodiment, the valve stem 23 is ground while the ring portion 43 is held by a chuck of a grinding machine after the forging process. Then, the ring portion 43 is ground while the valve stem 23 is held by the chuck. Since the central portion 41 of the valve body framework portion 60 does not extend to the front surface side in the present embodiment, the weight of the intake valve 20 can be further reduced.

It is to be noted that the present invention is not limited to the embodiments disclosed above, and many other changes, alternations and modifications may be made without departing from the scopes of the appended claims.

For example, in the disclosed embodiments, although it is disclosed that the valve body 22 of the intake valve 20 is produced by casting the valve body thick portion 45 (for example, AC9B (prescribed by JIS) into the valve body framework portion 40, aluminum alloy corresponding to AC9B may be used for the valve body thick portion 45, which is then caulked integrally with the front and rear surfaces of the framework portion 40 to thereby form the valve body 22.

What is claimed is:

1. An intake valve of an internal combustion engine, comprising:
   a valve body; and
   a valve stem extending from a central portion of the valve body,
   wherein the valve body includes a valve body framework portion and a valve body thick portion provided on an outer side of the valve body framework portion, and the valve body framework portion and the valve stem are made of iron material and the valve body thick portion is made of aluminum alloy.

2. The intake valve of the internal combustion engine according to claim 1, wherein the valve body thick portion is provided on a front surface side and a rear surface side of the valve body framework portion.

3. The intake valve of the internal combustion engine according to claim 2, wherein the valve body is formed by casting process so that the valve body thick portion wraps around the valve body framework portion.

4. The intake valve of the internal combustion engine according to claim 2, wherein the valve body framework portion of the valve body includes a plurality of through holes penetrating the valve body from the front surface side to the rear surface side.

5. The intake valve of the internal combustion engine according to claim 2, wherein the valve body framework portion of the valve body includes a plurality of spoke portions and an annular ring portion, the spoke portion extending from the central portion of the valve body and connected to the annular ring portion at the extending outer ends thereof.

6. The intake valve of the internal combustion engine according to claim 1, wherein the valve body framework portion of the valve body is constructed integrally with the valve stem.

7. The intake valve of the internal combustion engine according to claim 1, wherein the valve body framework portion of the valve body is constructed separately from the valve stem.

8. The intake valve of the internal combustion engine according to claim 1, wherein a curvature radius of the valve body framework portion on a rear surface side of the valve body is larger than a curvature radius of the valve body thick portion on a rear surface side thereof.

9. The intake valve of the internal combustion engine according to claim 1, wherein an outer periphery of the valve body framework portion of the valve body is exposed from the valve body thick portion as a valve sheet contact portion contacting a valve sheet.

* * * * *